United States Patent [19]

Nelson et al.

[11] Patent Number: 5,027,507
[45] Date of Patent: Jul. 2, 1991

[54] METHOD FOR CONTROLLING LEAKAGE THROUGH DEGRADED HEAT EXCHANGER TUBES IN THE TUBESHEET REGION OF A NUCLEAR GENERATOR

[75] Inventors: Lawrence A. Nelson; Robert F. Keating, both of Penn Township Westmoreland County, Pa.

[73] Assignee: Westinghouse Electric Corp., Pittsburgh, Pa.

[21] Appl. No.: 317,706

[22] Filed: Mar. 1, 1989

[51] Int. Cl.$^5$ .............................................. B23P 15/26
[52] U.S. Cl. ...................... 29/890.031; 29/402.01; 29/402.19; 29/407; 29/523; 29/890.044
[58] Field of Search .................... 29/890.031, 890.043, 29/890.044, 402.01, 402.19, 407, 523; 72/367, 370

[56] References Cited

U.S. PATENT DOCUMENTS

| Re. 30,802 | 11/1981 | Rogers, Jr. ............................. 29/421 |
| 3,608,173 | 9/1971 | Watson et al. ....................... 29/421 R |
| 3,977,068 | 8/1976 | Krips .................................... 29/421 R |
| 3,986,383 | 10/1976 | Petteys ................................. 72/293 |
| 4,083,093 | 4/1978 | Chertok ............................... 29/157.3 |
| 4,125,937 | 11/1978 | Brown et al. ......................... 29/727 |
| 4,159,564 | 7/1979 | Cooper, Jr. ........................... 29/421 |
| 4,159,741 | 7/1979 | Nonnenmann et al. ............. 165/173 |
| 4,182,013 | 1/1980 | Grossman ............................ 29/157.3 |
| 4,239,713 | 12/1980 | Brif et al. ............................. 264/40.1 |
| 4,347,652 | 9/1982 | Cooper, Jr. et al. ............ 29/890.031 |
| 4,368,571 | 1/1983 | Cooper, Jr. ........................... 29/421 R |
| 4,445,261 | 5/1984 | Kelly .................................... 29/157.4 |
| 4,505,017 | 3/1985 | Schukei ................................ 29/157.3 |
| 4,513,506 | 4/1985 | Vogeleer ............................... 33/147 K |
| 4,559,436 | 12/1985 | Roach et al. .................... 29/890.031 |
| 4,573,248 | 3/1986 | Hackett ............................ 29/890.031 |
| 4,592,577 | 6/1986 | Ayres et al. ..................... 29/890.031 |
| 4,606,491 | 8/1986 | Le Mong ........................ 29/890.031 |
| 4,607,426 | 8/1986 | Kelly .................................... 29/157.4 |
| 4,641,409 | 2/1987 | Shallenberger et al. ... 29/890.031 X |
| 4,649,493 | 3/1987 | Castner et al. ....................... 364/472 |

OTHER PUBLICATIONS

Westinghouse Electric Corporation Technical Disclosure Entitled "Tubesheet Roll Region Plugging Criteria Connecticut Yankee Nuclear Power Plant Series 27 Steam Generators", dated Oct. 1986.
Westinghouse Electric Corporation Technical Disclosure Entitled "Tubesheet Region Plugging Criterion For The Portland General Electric Company Trojan Nuclear Station", dated Sep. 1986.

Primary Examiner—Irene Cuda

[57] ABSTRACT

A method of controlling leakage through degraded heat exchanger tubes in the tubesheet region of a nuclear steam generator is disclosed herein. The method comprises radially expanding a section of the heat exchanger tube disposed within the bore of the tubesheet into leak resistant engagement so that the resultant leakage flow is equal to or less than an acceptable leakage flow rate. The expanded, leak resistant section is located above the degraded section of the heat exchanger tube and below the upper side of the tubesheet. The length L of the leak resistant section and the pressure P necessary to create it are determined by ascertaining a plurality of combinations of length Lx and pressure Px that would result in a sufficiently tight engagement between the heat exchanger tube and the tubesheet bore to achieve the desired leakage flow rate, and by choosing a combination of Lx, Px that results in the smallest length L without exceeding a pressure of 50 ksi (344.7 MPa).

19 Claims, 1 Drawing Sheet

METHOD FOR CONTROLLING LEAKAGE THROUGH DEGRADED HEAT EXCHANGER TUBES IN THE TUBESHEET REGION OF A NUCLEAR GENERATOR

BACKGROUND OF THE INVENTION

This invention generally relates to a method for controlling leakage between the primary and secondary sides of a heat exchanger, and is specifically concerned with a method for controlling leakage through degraded sections of heat exchanger tubes in the tubesheet region of a nuclear steam generator.

Systems and methods for eliminating or reducing leakage in the heat exchanger tubes of a nuclear steam generator are known in the prior art. In these systems, a tubular sleeve is inserted in the open end of the heat exchanger tubes in the tubesheet region of the generator. These sleeves are long enough to completely extend across the section of these tubes which may be degraded by corrosion and cracking. When the ends of the sleeve are connected to the inner walls of the heat exchanger tube by either welding or by expanding the sleeve ends into engagement with the inner walls of the tube, the sleeve forms a "hydraulic bridge" across the corroded and cracked section of the tube. The installed sleeve conducts hot, radioactive water from the primary side of the generator through the interior of the heat exchanger tube while preventing this water from seeping through the cracks and corrosion present in the degraded section of the tube and contaminating the non-radioactive water in the secondary side of the tube.

While such sleeving systems and methods have proven to be highly effective in eliminating or at least reducing leakage between the hot, radioactive water in the primary side and the non-radioactive water in the secondary side of the generator, such sleeving techniques require substantial amounts of time and labor, and hence are expensive. However, before the magnitude of these expenses can be appreciated, some general background as to the structure, operation and maintenance of nuclear steam generators is necessary.

Nuclear steam generators are comprised of three principal parts, including a secondary side, a tubesheet, and a primary side which circulates water heated from a nuclear reactor. The tubesheet is disposed between the primary and secondary sides, and serves to hydraulically isolate them from one another. The secondary side of the generator is provided with a plurality of heat exchanger tubes, which may be U-shaped, as well as an inlet for admitting a flow of water. Both the inlet and outlet ends of the U-shaped tubes are mounted in bores in the tubesheet. Such mounting is accomplished by welding the bottom end of the heat exchanger tubes around the bottom edge of the bore in the tubesheet through which it extends.

Hot, radioactive water flowing from the nuclear reactor is admitted into the section of the primary side containing all of the inlet ends of the U-shaped tubes. This hot, radioactive water flows through these inlets, up through the tubesheet, and circulates around the U-shaped tubes which extend within the secondary side of the generator. This water from the nuclear reactor transfers its heat through the walls of the U-shaped tubes to the non-radioactive feed water flowing through the secondary side of the generator, thus boiling the feed water into non-radioactive steam that in turn powers the turbines of an electric generator. After the water from the reactor circulates through the U-shaped tubes, it flows back through the tubesheet, through the outlets of the U-shaped tubes, and into the outlet section of the primary side, where it is circulated back to the nuclear reactor for re-heating.

The walls of the heat exchanger tubes of such nuclear steam generators can suffer from a number of different forms of corrosion degradation, one of the most common of which is intergranular attack (IGA) including cracking. Empirical studies have shown that the heat exchanger tubes are more susceptible to IGA in the crevice regions of the steam generator, the largest being the tubesheet region of the generator for the unexpended-tube design. In this tubesheet design, the heat exchanger tubes are surrounded along their lengths by an annular crevice created by the space between the outer wall of the heat exchanger tube and the surface of the surrounding bore in the tubesheet through which the tube extends. The relatively poor hydraulic circulation in such annular crevices can subject the water that fills these crevices to what is known in the art as nucleate boiling wherein the water is continuously flashed into steam. After long periods of time, such nucleate boiling can reduce various chemical compounds out of the water. These compounds ultimately form a sludge in the crevice. The aggressive chemical agents within these sludges, coupled with the hot spots that form around the heat exchanger tubes in these regions due to the poor or nonexistent hydraulic circulation around them, can promote corrosion on the outer surface of these tubes in the tubesheet region. Such corrosion can ultimately cause the tube walls to crack, and thereby set the stage for a leak of radioactive water from the primary side into the nonradioactive water present secondary side of the generator, thereby radioactively contaminating the steam produced by the steam generator.

In order to prevent such leakage from occurring between the primary and secondary sides, a tubular sleeve may be inserted into the open end of a heat exchanger tube having a degraded section in the tubesheet region. The sleeve is dimensioned that it is long enough to completely extend across the degraded section of the tube. After the sleeve has been so positioned, the bottom and top ends of the sleeve are secured into leak obstructing engagement with the inner walls of the heat exchanger tube by either brazing, welding, or radially expanding the ends of the sleeve with either a hydraulic expander tool, or a roller-type expander tool. Once installed, the sleeve forms a hydraulic bridge across the degraded section of the heat exchanger tube that obstructs water from the primary side of the generator from leaking through the tube walls and into the annular crevice between the tubesheet bore in the outer surface of the heat exchanger tube and from thence into the secondary side of the generator.

Unfortunately, such sleeving techniques require large amounts of time and effort as a single nuclear steam generator may have over 4,000 heat exchanger tubes mounted within its tubesheet. The financial losses become even more apparent when one considers that the steam generator must be completely shut down before any sleeving operation may be implemented, and that each day of shutdown typically costs the utility owners over $500,000 per day in lost revenues. The installation of such sleeves also reduces the available inner diameter of the tube which not only increases the flow resistance within the tube, but also makes it very difficult to slide other types of maintenance devices through the tube, such as the radiant heater probes used by the Westinghouse Electric Corporation to heat treat its U-bends of such tubes. Finally, such sleeving operations can induce residual tensile stresses in the tube walls which can promote additional corrosion, thus partially defeating the purpose of the sleeving operation.

Clearly, there is a need for a method for stopping or at least controlling leakage through the walls of degraded heat exchanger tubes in the tubesheet region of a nuclear steam generator that is faster and easier to implement than prior art sleeving techniques. It would be desirable if such a method did not result in the reduction of the inner diameter of the tube, and did not impart any substantial tensile stresses in the walls of the tube.

SUMMARY OF THE INVENTION

Generally speaking, the invention is a method for controlling leakage through the degraded portions of the heat exchanger tubes in the tubesheet region of a steam generator without the need for the installation of reinforcing sleeves. The method of the invention generally comprises the steps of determining the aggregate leakage flow rate from the primary to the secondary side of the generator that occurs through degraded sections of the heat exchanger tubes in the tubesheet region, ascertaining the number of heat exchanger tubes having degraded portions that contribute to this leakage, determining an acceptable per tube leakage rate, and then radially expanding a section of each of the end portions of heat exchanger tubes having such degraded tube sections into leak resistant engagement with the surrounding bore of the tubesheet so that the resulting leakage flow rate is equal to or less than the acceptable per tube leakage flow rate.

Prior to the step of expanding the leak resistant section of the tube, both the length L of the section as well as the radial expansion pressure P necessary to bring it into leak resistant engagement with the surrounding tubesheet bore are ascertained by first determining the pressure Px necessary to expand a length Lx of a nondegraded section of the end portion of the tube into an effective, leak resistant engagement for a plurality of lengths Lx and then selecting a combination of Lx and Px that results in the smallest length L without exceeding a pressure of 50 ksi. (344.7 MPa). Each of the pressures Px is in turn ascertained by determining analytically the minimum amount of pressure Pmin necessary to expand the leak resistant section to an extent where tube engagement is maintained with the surrounding bore during the operation of the steam generator, determining empirically the amount of additional pressure P+ for a given length Lx necessary to fulfill the acceptable leak rate criteria, and then adding Pmin and P+.

In the preferred method of the invention, the leak resistant section is disposed below the upper side of the tubesheet and above the degraded section of the tube. Substantially all of the tube end portion below the leak resistant section is preferably expanded into engagement with the tubesheet bore prior to the expansion of the leak resistant section to eliminate the annular space between the bore and the degraded section of the tube. This step prevents water from becoming trapped between the tube and the surrounding bore of the tubesheet when the leak resistant section of the tube is created. The presence of such water below the leak resistant section could generate pressurized steam between the tube and the surrounding bore of the tubesheet when the steam generator is placed back in operation that could potentially dent the heat exchanger tube. As a further prevention against such water entrapment, the expansion of the section of the tube below the leak resistant section is preferably implemented in increments from the bottom of the tube upwardly so as to push such water upwards toward the tubesheet. Similarly, the leak resistant section of the tube is created by expanding this section from the bottom edge to the top edge of the length L.

To minimize the amount of residual tensile stresses induced in the heat exchanged tubes by the radial expansions therein, these expansions are preferably implemented by hydraulic bladder expanders of a type known in the prior art. Such hydraulic expanders minimize the amount of cold work that the heat exchanger tube is subjected to when it is expanded, and are particularly preferred when the heat exchanger tubes are formed from metals which are apt to corrode when subjected to cold work, such as Inconel[1] 600. Alternatively, the degraded, lower portion of the tube may be expanded by hydraulic expander, while the leak resistant section may be created by means of a roller-type expander. If this technique is employed, the entire length of the heat exchanger tube within the tubesheet is preferably hydraulically expanded first before a roller-type expander is employed to complete the creation of the leak resistant section along its length L. The use of both a hydraulic and a rollertype expansion to create the leak resistant section has been found to induce significantly less tensile stress in the heat exchanger tube than if this section were created exclusively by a roller-type expander.

[1] Inconel is a U.S. registered trademark owned by the International Nickel Corporation.

BRIEF DESCRIPTION OF THE SEVERAL FIGURES

Figure 5:
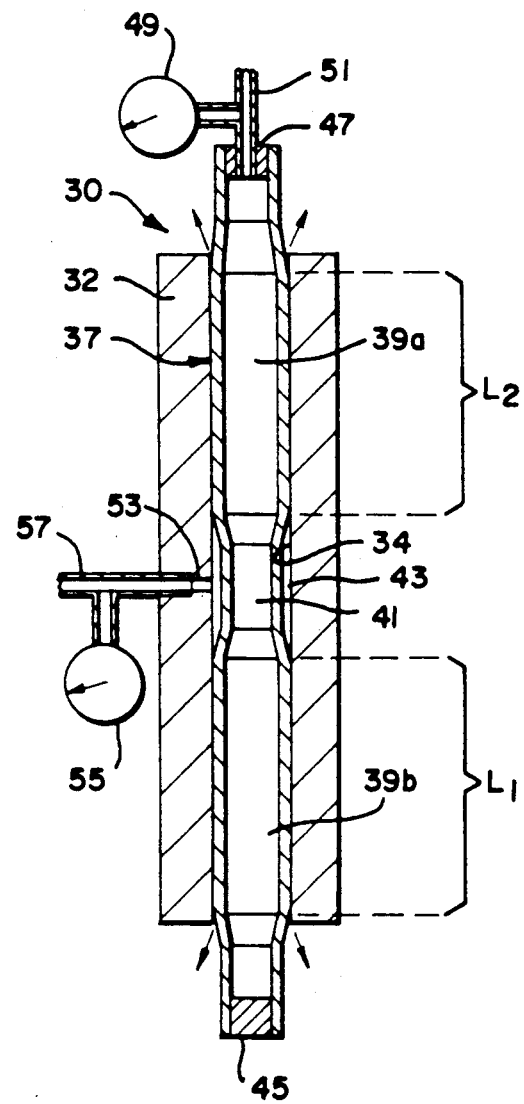
Figure 4:
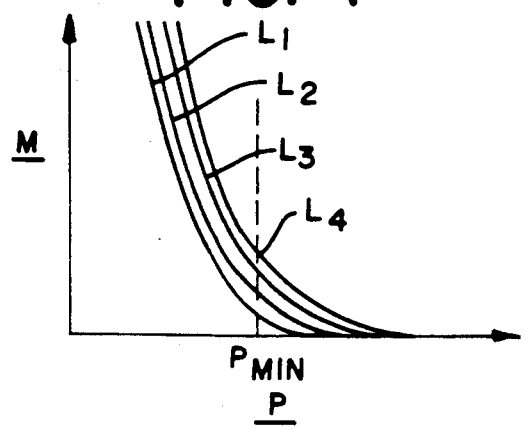

FIG. 4 is a graph illustrating the relationship between the resulting leakage rate M for a given expansion pressure P used to create a leak resistant section L in a heat exchanger tube for a variety of lengths L1, L2, L3 and L4, and FIG. 5 is a cross-sectional side view of a testing apparatus used to empirically determine the leakage rates associated with different lengths of expanded sections generated by different radial pressures.

DETAILED DESCRIPTION OF THE PREFERRED EMBODIMENT

Figure 1:
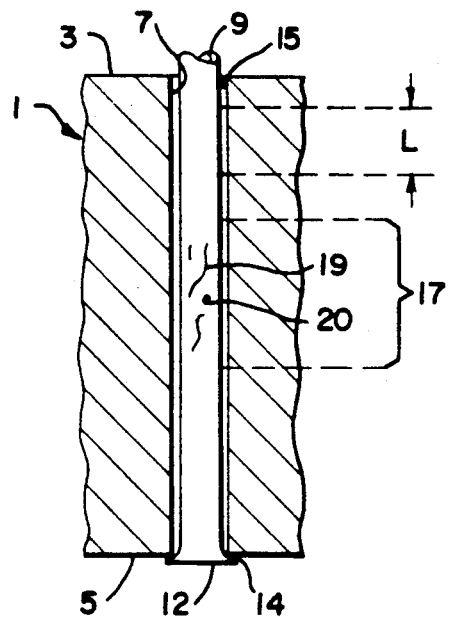
FIG. 1 is a partial, cross-sectional side view of a heat exchanger tube disposed in a bore in a tubesheet of a nuclear steam generator.
Figure 2:
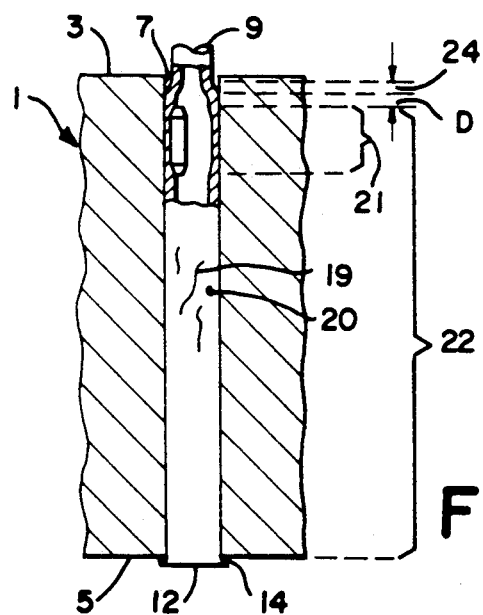
FIG. 2 is a partial, cross-section side view of the heat exchanger tube of FIG. 1 illustrating the sequence by which the tube is expanded in order to eliminate or minimize leakage between the outer wall of the tube, and the tubesheet bore that surrounds it.

With reference now to FIGS. 1 and 2, wherein like numerals designate like items throughout all of the several figures, the method of the invention serves to eliminate or at least reduce leakage between the primary and secondary sides of the nuclear steam generator that occurs in the tubesheet 1. In such generators, the upper side 3 of the tubesheet 1 borders the secondary side of the steam generator, while the lower side 5 borders the primary side. The tubesheet 1 has a plurality of bores 7 (only one of which is shown) which extend from the lower to the upper side 5,3 of the tubesheet 1 as shown. Each of these bores 7 houses a heat exchanger tube 9. In a typical nuclear steam generator, the tubesheet typically houses approximately 4500 heat exchanger tubes 9. The distal end of the tube 9 terminates in a flared opening 12 which receives hot, pressurized radioactive water from the primary side of the nuclear steam generator. The tube 9 is hydraulically sealed around the bore 7 of the tubesheet 1 by means of a weld bead 14 so that radioactive water from the primary side of the steam generator will not flow up through the annular space or crevice 15 present between the tube 9 and the bore 7 and contaminate the non-radioactive water present in the secondary side.

With specific reference to FIG. 1, sludge and debris can accumulate within the annular crevice 15 over a period of time as a result of the relatively poor hydraulic circulation in this region, and the nucleate boiling that occurs in this region that tends to distill out any dissolved solids which may be present in the secondary side water. The resulting sludge may contain aggressive chemical compounds which may produce a degraded section 17 in the tube 9 that includes through-wall cracks 19, or pits 20. If no maintenance operations are performed on the degraded section 17, radioactive water flowing through the interior of the tube 9 can leak out through the through-wall cracks 19 or pits 20 and contaminate the non-radioactive water in the secondary side through the annular crevice 15. The purpose of this invention is to prevent or at least reduce such primary to secondary side leakage without the need for installing a sleeve within the tube 9.

The method of the invention eliminates or at least reduces the leakage that occurs between the primary and secondary sides through the degraded section 17 by expanding a tube section 21 of length L that is located between upper side 3 of the tubesheet 1, and the degraded section 17. This tube section 21 should be completely free of the corrosion and cracks that characterize the degraded section 17. However, before the leak resistant section 21 is created, the entire length 22 of the portion of the tube 9 disposed within the tubesheet 1 is expanded to eliminate the annular crevice 15 between the outer surface of the tube 9 and the bore 7, as is best seen in FIG. 2. There are three advantages associated with expansion of the entire length 22 of the tube 9 within the tubesheet 1. First, such an expansion prevents water from becoming entrapped between the tube 9 and the bore 7 when the leak resistant section 21 is created. This is important, as any water left in this region could vaporize into steam when the nuclear generator is in operation, which in turn could create pressures great enough between the bore 7 and the tube 9 to dent or otherwise damage the tube 9. Secondly, the elimination of the annular crevice 15 provides at least some flow resistance to any water which may leak out through the through-wall cracks 19 and pits 20 in the degraded section 17. While the precise extent to which the expansion of the entire section 22 retards leakage through the degraded section 17 cannot be ascertained for each individual tube 9 being treated, the leak retardation provided by such an expansion will at least provide a greater margin of safety in the estimated tolerances of the length L and the pressure P necessary to create the leak resistant section 21. Thirdly, if the expansion of the section 22 is implemented with a hydraulic expansion tool, the amount of residual tensile stresses imparted to the leak resistant section 21 are substantially less if the balance of the radial expansion necessary to create the section 21 is implemented solely by means of a roller-type expander tool. To facilitate the objective of removing all water from the crevice 15 before the leak resistant section 21 is created, all of the loose sludge on top of the tubesheet should be removed. This may be done by means of well-known sludge lance techniques. In the alternative, the unwanted water in the tubesheet crevice could also be boiled off through the use of radiant heaters.

Prior to the expansion of the leak resistant section 21, both the length L of this section and the radial pressure P necessary to bring it into sealing contact with the bore 7 must be determined. Generally speaking, the higher the pressure P used to radially expand the section 21, and the longer its length L, the smaller the leakage flow through the leak resistant section 21. In theory, there are any one of a number of different lengths $L_x$ and different hydraulic expansion pressures $P_x$ which would result in a leak resistant section 21 capable of reducing leakage between the primary and secondary sides of the generator to an acceptable low level. The complete blockage of all leakage is neither necessary nor even preferred when other practicalities are considered. While roller-type expander tools are known which are capable of permanently deforming the walls of a tube 9 into a completely leak-tight engagement with a surrounding bore 7, these tools must generate very high pressures within the tubes 9 in order to attain such leak-tight engagement. Additionally, the imposition of very high expansive pressures within the tubes 9 imparts residual tensile stresses in the Inconel that forms these tubes. The higher these residual tensile stresses are, the more these stresses tend to promote stress corrosion cracking. Additionally, the higher the pressure required to create the leak resistant section 21, the longer the method will take to implement. A final important factor to consider is that NRC (Nuclear Regulatory Commission) regulations do not require that the joint between the heat exchanger tubes 9 and the tubesheet 1 be completely leak-tight. Rather, these regulations typically only require that the aggregate leakage rate between all of the tubes 9 and the tubesheet 1 be no more than 0.350 gpm (1.325 lpm) when the steam generator is in normal operation. While such leakage will result in some radioactive contamination of the steam that drives the turbines in the electric utilities, the NRC has determined that the resulting contamination is too small to be considered a health or safety factor.

In view of the foregoing practical constraints, the applicants have developed a decision-making procedure that will result in controlled leakage well within NRC regulations while minimizing both the time required to expand the tube 9 into leak-resistant engagement with the bore 7 and the resulting residual tensile stresses generated within the walls of the tube 9. In the first step of this procedure, the number and location of tubes 9 having a degraded section 17 which is a potential source of leakage is determined. This may be done by inspecting each of the tubes 9 with an, eddy current probe as is well known in the art. As such tube inspections have been routinely carried out over the history of many nuclear steam generators now in operation, a separate eddy current probe inspection may not be necessary;

the utility operator may already have the necessary data from prior inspections concerning the numbers and location of such degraded tubes. Once the number of tube ends having a degraded section 17 is determined, this number is divided into the NRC typical acceptable aggregate leakage rate of 0.350 (1.325 lpm) gpm in order to determine a maximum acceptable leakage rate on a per tube end basis.

After such a per-tube end leakage rate is determined, the length L and radially expansive pressure P necessary to create a leak-resistant section 21 capable of achieving at least the maximum per tube end leakage rate is ascertained. This is accomplished by first determining the minimum amount of pressure Pmin that is required to bring the tube section 21 into leak-obstructing engagement with the bore 7 when the nuclear steam generator 1 is in operation. An overly simplistic approach to solving this aspect of P would be simply to expand a tube in the bore of a simulated tubesheet where the annular crevice in the test mock-up is the same dimensions as the annular crevice 15 in the actual nuclear steam generator without an interference fit between the two parts. However, the applicants have determined that such a simplistic approach would lead to inaccurate results because due to the fact that the actual dimensions of the crevice 15 are significantly larger under operating conditions than under non-operating conditions. Part of this difference in dimensions is attributable to the pressure that the primary side water applies to the bottom side 5 of the tubesheet, which tends to bow or bulge the entire tubesheet 1 upwardly. Additionally, the thermal differential expansion that exists between the Inconel forming the tube 9 and the carbon steel forming the tubesheet 1 act to cause or to increase an interference fit between the two parts. Differential pressure between the primary and secondary sides also contributes to the difference in dimensions between the tubes and tubesheet of an operating steam generator and a laboratory mock-up. When these three crevice-affecting factors are considered, the applicants have determined that, in a typical nuclear steam generator, a radially expansive pressure of at least about 30 ksi (206.82 MPa) is necessary to plastically deform the walls of the tube 9 in the section 21 to the point where these walls stay in engagement (i.e., have a minimal interference fit) with the bore 7 during operating conditions.

Figure 3:
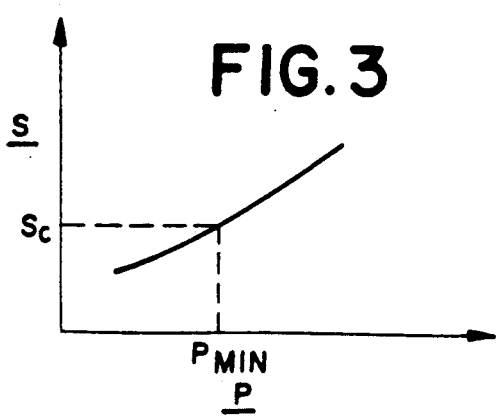
FIG. 3 is a graph illustrating the relationship between the residual stress S imparted between a heat exchanger tube and its surrounding bore and the hydraulic radial pressure P applied within the tube in order to expand it.

In the next step of the procedure, the length L of the section 21 is determined, as well as the total pressure P necessary to expand it into leak resistant engagement with the bore 7 by means of the graphs illustrated in FIGS. 3 and 4, and the test device 30 illustrated in FIG. 5. This test device 30 is placed in an autoclave (not shown). and includes a simulated section of a tubesheet 32 having a bore 34 that is substantially the same diameter and length as the bore 7 within the actual tubesheet 1. A test specimen heat exchanger tube 37 is placed within this bore 34 that is of the same dimensions and type of Inconel as the heat exchanger tubes 9 in the actual generator. Two different sections 39a and 39b are expanded into leak resisting engagement with the bore 34. An unexpanded portion 41 is left between the two expanded portions 39a and 39b in order to form a manifold for the conduction of pressurized water for a purpose which will become evident hereinafter. The tube 37 is sealed at its bottom and top ends by bottom plug 45 and top plug 47, respectively. Under test conditions, the tube 37 is filled with water, and a pressure meter 49 is connected to the top plug 47 by way of a fitting 51 so that the pressure of the water contained within the tube 37 may be measured. A horizontal bore 53 is provided in the middle of the simulated tubesheet 32 for conducting pressurized water to the manifold 43. This bore 53 is connected to a pressure meter 55 by way of a fitting 57 so that the pressure of the water admitted into the manifold 43 may be measured.

In operation, the test heat exchanger tube 37 is slid into the bore 34, and the portions 39a and 39b are expanded along different lengths, which may be designated as L1 and L2. Additionally, the pressure used to radially expand these lengths L1 and L2 is carefully recorded, and may be designated as P+1 and P+2. Of course, the pressure P needed to obtain a similar radial expansion in the actual generator would be the sum of Pmin plus P+1 or P+2.

After the test heat exchanger tube 37 has been so expanded, the plug 45 is installed, the tube 37 is filled with water, and the top plug 47 is installed as shown. Next, both the fittings 51 and 57 are connected to a source of water that is pressurized to a value which accurately simulates the differential pressure between the water in the primary and secondary sides of the nuclear steam generator to be serviced. This pressurized water enters the manifold 43, and leaks out of both the top and bottom ends of the test device as shown by the flow arrows. The rate of leakage is carefully measured and recorded.

After many tests have been conducted wherein the portions 39a and 39b are expanded at different lengths and under different radial expansion pressures, the resulting data are plotted in the graph of FIG. 4, wherein the ordinate or Y axis indicates the leakage rate M while the abscissa or X axis represents the pressure P used in expanding the test heat exchanger tube 37. When so plotted the data form a family of curves, one for each particular length L1, L2, L3, and L4. As is plainly evident in FIG. 4, the leakage rates for any given length L1 through L4 diminish sharply after the minimum engagement pressure Pmin has been attained.

In the final step of the parameter selection process, the system operator selects the shortest possible L that will achieve the desired leakage rate which is fabricated with a pressure P that is 50 ksi or less. While tools are available which are capable of applying expansion pressures upwards of 80 ksi (551.52 MPa). 50 ksi (344.7 MPa) has been chosen as the maximum desired pressure as pressures much above this limit are substantially more difficult to implement.

When the actual expansion of the sections 21 and 22 is performed, the system operator may conveniently use the analytically derived Pmin in order to expand the complete length 22 of the heat exchanger tube 9 prior to the expansion of the leak resistant section 21. In most instances, the expansion of the length 22 will best be performed by means of a hydraulic, bladder-type expander of the type developed and patented by the Westinghouse Electric Corporation. To ensure that the sludge and water in the crevice 15 is not entrapped between the bore 7 and the tube 9 when this expansion is carried out the expansion of the section 22 should be made in overlapping increments starting from the bottom side 5 of the tubesheet 1 all the way up to near the top side 3 as indicated. While a roller-type expanding tool could also be used, hydraulic expander tools minimize the amount of cold-work that the walls of the tube 9 are subjected to. This is particularly important when the heat exchanger tubes 9 are formed from Inconel 600, a metal which has a tendency to undergo stress corrosion cracking when cold-worked to a certain level and exposed to the appropriate environment.

After the entire length 22 has been so expanded, the leak resisting section 21 is formed. Again, if the tube is formed from Inconel 600, section 21 is best created by means of a hydraulic expander. However, if the tubes are formed from ferritic, a roller-type expander tool may advantageously be used as this particular type of metal is not particularly sensitive to stress corrosion cracking after being cold-worked and exposed to certain environments. In this last case, the stress pattern created in the walls of the tube 9 by the hydraulic expansion of the tube length 22 advantageously prevents at least some of the stress pattern induced in the section 21 by a roller-type tool. In either case, care should be taken to choose a location for the section 21 that is completely nondegraded along its length L. Moreover, the top border of this section 21 should be at least approximately 0.250 inches (0.635 cm) below the transition zone 24 created when the overall length 22 is expanded.

What is claimed is:

1. A repair method for controlling leakage between fluids circulating in the primary and secondary sides of a heat exchanger that occurs through a degraded section of an end portion of a heat exchanger tube that extends through a bore in a tubesheet having lower and upper sides that border said primary and secondary sides, respectively, wherein an annular space is present between the heat exchanger tube and the bore in the tubesheet, comprising the steps of:
   a. determining an acceptable leakage flow rate of primary side fluid through said degraded tube section, and
   b. radially expanding a non-degraded section of length L of said end portion of said tube into engagement with said bore to form a leak resistant section by applying a radial expansion pressure P equal to or less than 50 ksi in said tube such that the resulting leakage flow rate is equal to or less than said acceptable leakage flow rate.

2. A repair method for controlling leakage between circulating fluids in a heat exchanger as defined in claim 1, further including the step of determining P and L by ascertaining the pressure Px necessary to expand a length Lx of the non-degraded section of said end portion into said leak resistant engagement for a plurality of lengths Lx, and then selecting a combination of Px, Lx that results in the smallest length without exceeding a pressure of 50 ksi.

3. A repair method for controlling leakage between circulating fluids in a heat exchanger as defined in claim 2, wherein each pressure Px is ascertained by determining analytically the minimum amount of pressure Pmin necessary to expand said leak resistant section to the extent where engagement is maintained between said expanded section and said bore during the operation of the heat exchanger, determining empirically the amount of additional pressure P+ for a given length Lx necessary to fulfill said acceptable leak rate criteria, and then adding Pmin and P+.

4. A repair method for controlling leakage between circulating fluids in a heat exchanger as defined in claim 1, wherein said leak resistant section of said tube portion is located between said degraded tube section and the upper side of the tubesheet.

5. A repair method for controlling leakage between circulating fluids in a heat exchanger as defined in claim 4, further comprising the step of expanding substantially all of the tube end portion into engagement with said tubesheet bore prior to expanding said leak resistant section in order to eliminate the space between said bore and the degraded section of the tube end portion prior to expanding said leak resistant section.

6. A repair method for controlling leakage between circulating fluids in a heat exchanger as defined in claim 1, wherein said heat exchanger tube is formed from Inconel 600, and said expansion of the leak resistant section is implemented by a hydraulic expander to minimize the amount of cold-work performed along the leak resistant section.

7. A repair method for controlling leakage between circulating fluids in a heat exchanger as defined in claim 1, wherein said heat exchanger tube is formed from ferritic, and said expansion of the leak resistant section is implemented by a roller-type expander tool.

8. A repair method for controlling leakage between circulating fluids in a heat exchanger as defined in claim 1, wherein said acceptable leakage flow rate per heat exchanger tube is determined by dividing the number of heat exchanger tubes into an aggregate acceptable leakage flow rat for the entire heat exchanger.

9. A repair method for controlling leakage between circulating fluids in a heat exchanger as defined in claim 8, wherein said heat exchanger is a nuclear steam generator, and said aggregate acceptable leakage flow rate from the primary to the secondary side is between about 0.250 gpm to 0.450 gpm.

10. A repair method for controlling leakage from the primary side to the secondary side of a steam generator that occurs through degraded sections of the end portions of heat exchanger tubes extending through respective bores in a tubesheet having lower and upper sides that border said primary and secondary sides, respectively, comprising the steps of:
    a. determining an acceptable leakage flow rate for each tube having a degraded section by dividing the number of such tubes into an aggregate acceptable leakage flow rate for the steam generator;
    b. determining the amount of pressure P necessary to radially expand a non-degraded section L of each of the end portions of said tubes having a length L into leak resistant engagement with its respective tubesheet bore so that the resulting leakage flow rate is equal to or less than the acceptable leakage rate per tube, wherein said length L of said expanded section is located between said degraded section and said upper side of said tubesheet, and
    c. expanding said non-degraded section along length L with an expansion tool that generates a pressure P of no more than about 50 ksi to create a leak resistant tube section.

11. A repair method for controlling leakage of a steam generator as defined in claim 10, wherein P and L are determined by ascertaining the pressure Px necessary to expand a length Lx of the non-degraded section of said end portion into said leak resistant engagement for a plurality of lengths Lx, and then selecting a combination of Px, Lx that results in the smallest length without exceeding a pressure to 50 ksi.

12. A repair method for controlling leakage of a steam generator as defined in claim 11, wherein each pressure Px is ascertained by determining analytically the minimum amount of pressure Pmin necessary to expand said leak resistant section to the extent where engagement is maintained between said expanded section and said bore during the operation of the heat exchanger, determining empirically the amount of additional pressure P+ for a given length Lx necessary to fulfill said acceptable leak rate criteria, and then adding Pmin and P+.

13. A repair method for controlling leakage of a steam generator as defined in claim 12, wherein P is selected between 30 ksi and 50 ksi.

14. A repair method for controlling leakage of a steam generator as defined in claim 10, further comprising prior to step (c), the step of expanding the tube along the entire length L into contact with the surrounding bore to prevent water from becoming trapped between said tube and said bore upon the creation of the leak resistant tube section.

15. A repair method for controlling leakage of a steam generator as defined in claim 14, wherein said expansion of the end portion of the tube is incrementally implemented from the lower to the upper ends of the tube end portion to avoid entrapment of water between said tube portion and said bore.

16. A repair method for controlling leakage of a steam generator as defined in claim 10, wherein said heat exchanger tube is formed from Inconel 600, and said expansion of the leak resistant section is implemented by a hydraulic expander to minimize the amount of cold work performed along the leak resistant section.

17. A repair method for controlling leakage of a steam generator as defined in claim 10, wherein said heat exchanger tube is formed from ferritic, and said expansion of the leak resistant section is implemented by a roller-type expander tool.

18. A repair method for controlling leakage of a steam generator as defined in claim 10, wherein said nondegraded section is incrementally expanded along its length L from its bottom end up to avoid entrapment of water between said tube portion and said bore.

19. A repair method for controlling leakage of a steam generator as defined in claim 10, further including the step of removing sludge deposits from the upper side of the tubesheet prior to expanding said nondegraded section along length L to create said leak resistant tube section.

* * * * *